United States Patent [19]

Colodner et al.

[11] Patent Number: 4,703,165

[45] Date of Patent: Oct. 27, 1987

[54] TOKEN WITH INFORMATION DATA

[76] Inventors: Jesse L. Colodner, 322 Orangeburg Rd., Pearl River, N.Y. 10965; Conrad Riumbau, 33-04 Junction Blvd., Jackson Heights, both of N.Y. 11372

[21] Appl. No.: 868,698

[22] Filed: May 30, 1986

[51] Int. Cl.$^4$ ............................................. G06K 19/06
[52] U.S. Cl. ....................................... 235/487; 235/493
[58] Field of Search ................................ 235/487, 493

[56] References Cited

U.S. PATENT DOCUMENTS 4,006,342  2/1977  Baumann .............................. 235/493

Primary Examiner—Harold I. Pitts

[57] ABSTRACT

This token is designed for wearing and carrying purposes, and is provided with magnetic information data. Primarily, it consists of a pair of clear out discs that are glued to a central disc containing information that can be sensed by machine. It further includes openings for it to be strung, stacked, fed into a machine, packaged, etc.

5 Claims, 3 Drawing Figures

TOKEN WITH INFORMATION DATA

BACKGROUND OF THE INVENTION

1. Field of the Invention

This invention relates to coins, and more particularly, to a token with information data.

2. Description of Prior Art

References of record are the U.S. patents of Ake G. V. Remning 3,636,616, Lee E. Burpee 3,766,452, Bernard B. Jones 3,968,582, Allan J. Abedor et al 4,371,071, Norimoto Suzuki et al 4,499,126, and Gerhard Stenzel 4,527,051.

The principal object of this invention is to provide a token with information data, which will be of such design, as to have the appearance of a coin, pendant, a subway token or the like, and it will have on its center, a substrate containing magnetic information.

Another object of this invention is to provide a token with information data, which will be of such design, as to be of laminate construction that will be provided with openings for stringing same, stacking same, and feeding same by machine means.

Another object of this invention is to provide a token with information data, which will have one opening for the purpose of receiving a piece that will be employed to actuate electronic devices, such as, doors and the like.

A further object of this invention is to provide a token with information data, which will also be decorative in appearance, so as to enhance a wearer's appearance.

SUMMARY OF THE INVENTION

Figure 1:
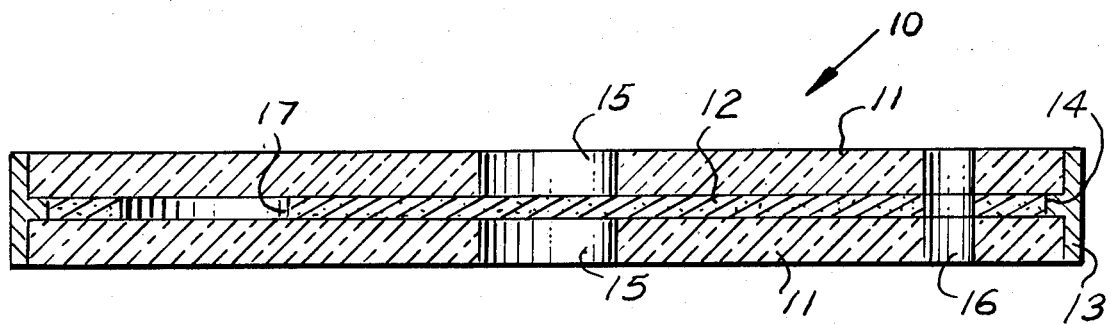
FIG. 1 is a greatly enlarged cross-sectional view, taken along the line 1—1 of FIG. 2.
Figure 2:
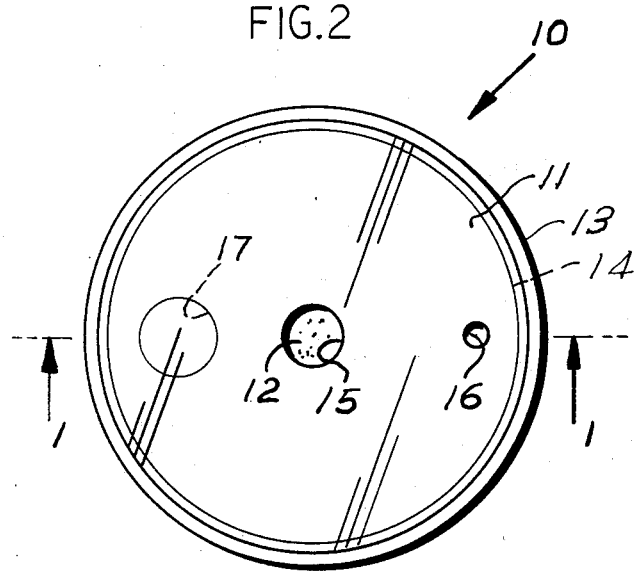
FIG. 2 is an enlarged face view of the present invention, shown in elevation.
Figure 3:
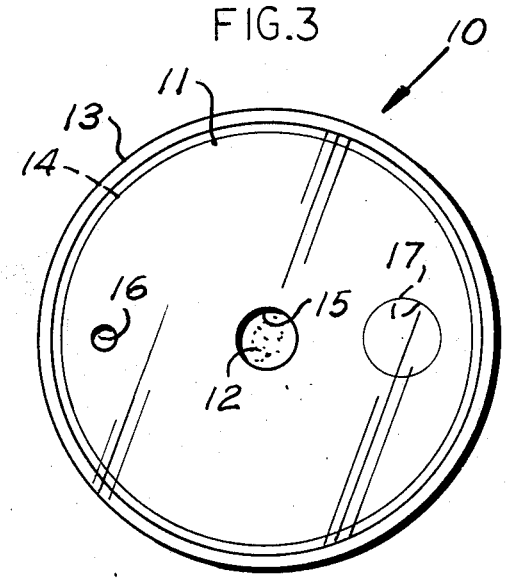
FIG. 3 is similar to FIG. 2, but shows the opposite face.

A token, comprising a pair of outer discs fabricated of a clear plastic and adhered to a central substrate of magnetic material that is provided with information to be sensed, and openings are also provided for stringing a plurality of the tokens, feeding them by machine, stringing one for wearing purposes or carrying purposes, stacking them, and for the insertion of a piece or article to enable the actuation of electronic devices for openings doors, etc.

DETAILED DESCRIPTION

Accordingly, a token 10 is shown to include a pair of discs 11 fabricated preferably of a clear plastic. Discs 11 are suitably adhered to the faces of a substrate disc 12, having magnetic information therein, to be sensed. A gold plating 13 is electrostatically deposited to the outer peripheral rim and in the annular groove 14 of token 10 and a central opening 15 is provided through both of the discs 11, for sensing means to be employed to readout magnetic data or information contained on disc 12. A second opening 16 is provided through both discs 11 and disc 12, which may be employed to string token 10 for it to be worn, stacked on a spindle, or fed by machine. A third opening 17 is also provided in disc 12 near one peripheral edge, for information readout, and it shall be noted, that token 10 is fabricated as thin as possible.

In use, token 10 may be worn by stringing it on a cord or other means, which will be received in the opening 16, and the opening 16 may be employed in conjunction with the openings 15 for machine feed of token 10. The opening 16 may also be used to stack a plurality of tokens 10 on a spindle or post, and the openings 15 may be employed for uniform packaging of a plurality of tokens 10, by plastic cards having raised nipples that will be received in the openings 15.

While various changes may be made in the detailed construction, such changes will be within the spirit and scope of the present invention, as defined by the appended claims.

What is claimed is:

1. A token with information data, comprising, a pair of discs, for covering a substrate disc having magnetic information to be sensed, and openings provided in said token for sensing purposes, stringing said token, stacking said token, and packaging said token.

2. A token with information data as set forth in claim 1, wherein each one of said pair of discs are fixedly secured to a face of said substrate disc having magnetic information to be sensed, and a first opening extends through said pair of discs and through said substrate disc and removably receives a cord or a spindle.

3. A token with information data as set forth in claim 1, wherein a second opening is provided through the center of said each one of said pair of discs and removably receives an article that employs the informational data stored in said substrate disc, to program electronic devices, and the second opening removably receives a plurality of projecting nipples on a card for packaging a plurality of tokens.

4. A token with information data as set forth in claim 3, wherein the second opening also removably receives a finger or projection of a machine that feeds and counts a plurality of tokens.

5. A token with information data as set forth in claim 4, wherein a third opening is off-set of the center of said substrate disc, is covered by said pair of discs and is employed for information readout.

* * * * *